United States Patent
Van Oord

(10) Patent No.: US 6,558,108 B1
(45) Date of Patent: May 6, 2003

(54) APPARATUS FOR PALLETIZING SUBSTANTIALLY CYLINDRICAL OBJECTS

(75) Inventor: Jan J. J. Van Oord, Ulvenhout (NL)

(73) Assignee: Celema B.V. (NL)

( * ) Notice: Subject to any disclaimer, the term of this patent is extended or adjusted under 35 U.S.C. 154(b) by 0 days.

(21) Appl. No.: 09/589,089

(22) Filed: Jun. 8, 2000

(51) Int. Cl.$^7$ .......................... B65G 57/00; B65H 29/00
(52) U.S. Cl. ............................. 414/789.5; 414/792.5; 414/792.9; 206/386; 206/499; 53/116; 53/117; 53/157; 53/591
(58) Field of Search .................. 414/789.5, 792.9, 414/792.5; 206/397, 386, 499; 53/116, 117, 157, 591

(56) References Cited

U.S. PATENT DOCUMENTS

| | | | |
|---|---|---|---|
| 3,695,539 A | * 10/1972 | Lindstaedt | 242/58.6 |
| 4,079,645 A | * 3/1978 | Nunes et al. | 83/92 |
| 4,485,612 A | * 12/1984 | Piesen et al. | 53/504 |
| 4,538,956 A | * 9/1985 | Kalkbrenner et al. | 414/735 |
| 4,558,830 A | * 12/1985 | Larsson | 242/54 R |
| 4,568,231 A | * 2/1986 | Czajka et al. | 414/32 |
| 4,579,498 A | * 4/1986 | Lukkari et al. | 414/36 |
| 4,642,017 A | * 2/1987 | Fenn | 414/348 |
| 4,709,953 A | * 12/1987 | Sirota | 294/106 |
| 4,772,170 A | * 9/1988 | Oldfield | 414/57 |
| 4,819,758 A | * 4/1989 | Greene et al. | 180/168 |
| 4,941,374 A | 7/1990 | Focke | |
| 4,948,060 A | * 8/1990 | Kurz et al. | 242/58.1 |
| 4,979,870 A | * 12/1990 | Mojden et al. | 294/87.1 |
| 4,997,336 A | * 3/1991 | Galbani | 414/790.2 |
| 5,114,200 A | * 5/1992 | Visnyouszky | 294/81.56 |
| 5,274,984 A | * 1/1994 | Fukuda | 53/451 |
| 5,451,133 A | * 9/1995 | Salsburg et al. | 414/401 |
| 5,605,432 A | * 2/1997 | Fink et al. | 414/752 |
| 5,674,049 A | * 10/1997 | Pienta et al. | 414/798.7 |
| 5,769,601 A | 6/1998 | Agné et al. | |
| 5,927,937 A | * 7/1999 | Anderson | 414/792.9 |

FOREIGN PATENT DOCUMENTS

| | | | | |
|---|---|---|---|---|
| DE | 3401720 A | * 7/1984 | | B65G/65/02 |
| DE | 3334769 A | * 4/1985 | | B65B/25/00 |
| EP | 1008526 A1 | * 6/2000 | | B65B/61/20 |
| GB | 2158042 A | * 11/1985 | | B66C/1/02 |
| JP | 08012079 A | * 8/1996 | | B65G/57/03 |
| JP | 09030509 A | * 9/1997 | | B65B/17/00 |
| JP | 11157653 A | * 11/1999 | | B65G/57/18 |

* cited by examiner

Primary Examiner—Donald P. Walsh
Assistant Examiner—Jeffrey A. Shapiro
(74) Attorney, Agent, or Firm—Banner & Witcoff, Ltd.

(57) ABSTRACT

An apparatus for palletizing substantially cylindrical objects. The apparatus comprises at least one position-defining support device for at least one pallet, a supply of the cylindrical objects for palletizing, at least one holder for a roll of material intended for arrangement between the palletized objects and a handling device for removing the cylindrical objects from the supply and placing them on the pallet. The apparatus also comprises at least two support members each arranged on a side of a base of the position-defining support device. The handling device is adapted to removably place the at least one holder for the roll of material on different support devices after a number of objects for palletizing have been placed on the pallet. A method comprises placing onto a pallet the strip of paper or foil unwound from the at least one holder; subsequently placing a number of cylindrical objects on this strip of paper using the handling device, whereafter the holder for the material can be moved from a first position-defining support device to a second position-defining support device arranged on an opposite side of the pallet by the handling device. It is then possible to continue with the arranging of the cylindrical objects until the holder is displaced again by the handling device in the direction of the first position-defining support device.

19 Claims, 4 Drawing Sheets

APPARATUS FOR PALLETIZING SUBSTANTIALLY CYLINDRICAL OBJECTS

The present invention relates to an apparatus for palletizing substantially cylindrical objects, comprising:
- position-defining means for at least one pallet; and
- a handling device for placing the rolls of can lids on the pallet.

Such an apparatus is generally known.

This known apparatus makes use of a complicated device for handling the support for the rolls of paper as well as for the objects for palletizing. Use is always made of different handling devices for these tasks.

This results in a complicated embodiment of such a handling device, while the control thereof is also complicated.

The object of the present invention is to prevent these problems associated with the prior art.

This objective is achieved in that the handling device is adapted to handle position-defining means for the cylindrical objects.

As a result of these measures it is easy for the robot generally applied in such devices to perform the diverse operations sequentially; it can after all make use of the support for placing of the holders.

The sequence applied herein comprises the steps of placing onto a pallet the strip of paper or foil unwound from the holder; and subsequently placing a number of cylindrical objects on this strip of paper, whereafter the holder for the paper can be moved to the support arranged on the other side of the pallet. It is then possible to continue with the arranging of the cylindrical objects until the holder is displaced again.

The essential point is to protect the outer objects of a layer against becoming detached from the stack, particularly when this last object is not supported by two other objects but only by one other object.

With this configuration it is possible to maintain the full width of the layers of stacked objects as the height increases.

It will be apparent that diverse winding patterns can be applied. It is particularly important here that the objects arranged at the sides be wrapped.

It is even possible to apply wrapping paper which has a width smaller than or equal to half the length of the objects, wherein for each of the rows of objects on the pallet at least two rolls of wrapping paper are arranged which can each be placed independently of each other on the holders. This provides an additional option of using wrapping patterns, whereby the layers of objects stacked on the pallet are better secured.

According to another preferred embodiment the length of the objects is less than the width of the pallet and the apparatus is adapted to place the objects in at least two rows adjacently of each other on the pallet. This embodiment provides the option of placing shorter objects, while there is also the possibility of fixing each of the series of objects mutually adjacently in another pattern by means of paper strips.

According to a particular preferred embodiment the apparatus is adapted to handle stacks of can lids combined into a unit.

Can lids are objects which must be transported in great volumes from the factory location to the location where they are fixed for instance as a base to a can or to a location where the filled can must be closed with a lid. For easy handling such can lids are packed in stacks and said stacks are palletized. The present invention is particularly applicable in such situations.

The invention also relates to a method for palletizing substantially cylindrical objects, comprising the following steps of:
- carrying onto a pallet an unwound end of a strip of paper wound onto a roll;
- placing a number of objects on the pallet onto the unwound end of the paper strip;
- carrying the roll of paper from a support placed on one side of the pallet to a support placed on the other side of the pallet; and
- repeating the latter stated steps until the pallet is loaded, wherein the operations are performed by the same handling device.

It is pointed out here that the invention is not only relevant for this application; other cylindrical objects, and not necessarily circular cylindrical objects, can also be fixed on a pallet in this way.

The present invention will be elucidated hereinbelow with reference to the annexed drawings, in which.

Figure 1:
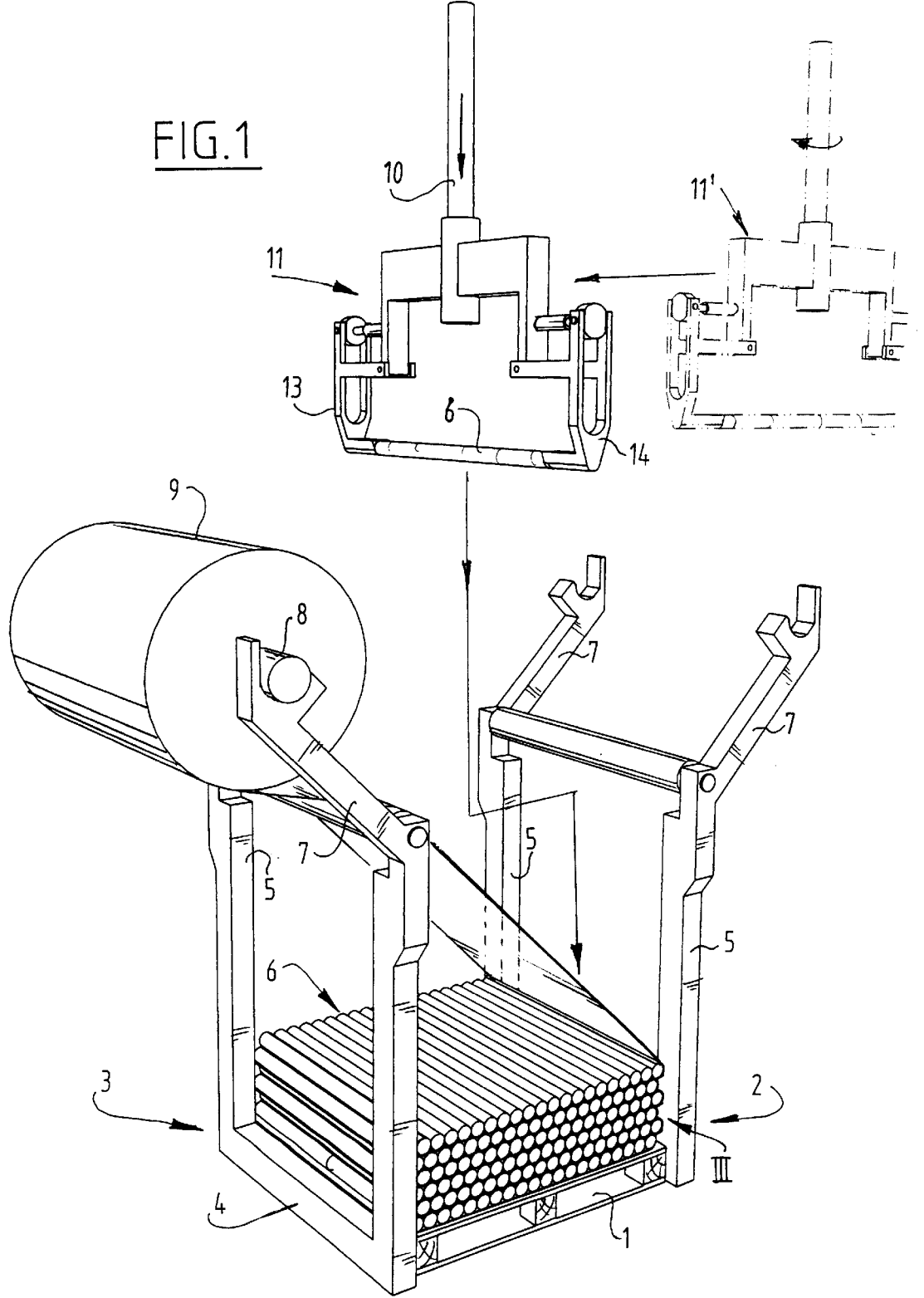
FIG. 1 shows a perspective view of an apparatus according to the invention when the roll of paper is placed on a first holder.

FIG. 1 shows a pallet 1 placed between two U-shaped frames 2 respectively 3. The bottom horizontal member 4 of both, U-shaped frames defines the position of pallet 1. Two sides are herein left clear to enable picking up of the filled pallet with a fork-lift truck.

The posts 5 of each of the U-shaped frames 2,3 ensure that products 6 stacked on pallet 1 are fixed during stacking. It is also possible to me use of open or closed side walls instead of U-shaped frames.

A support clamp 7 is further arranged on the top of each of the posts 5. Support clamps 7 form together in pairs one support. A holder in the form of shaft 8 can be placed in each of the two thus formed supports for the purpose of holding a roll of wrapping paper.

It will be apparent that instead of paper other products can be used, such as plastic foil, metal foil and so on. In addition, fabrics can be used such as textile fabrics or synthetic fabrics or nets.

For arranging the products 6, use is made of a robot arm 10 on which is mounted a handling device 11. This latter comprises a frame 12 to which are fixed two rods 13, 14 for picking up and setting down products 6. Although here only one particular configuration of robot is shown, it will be apparent that numerous variations are possible.

Figure 2:
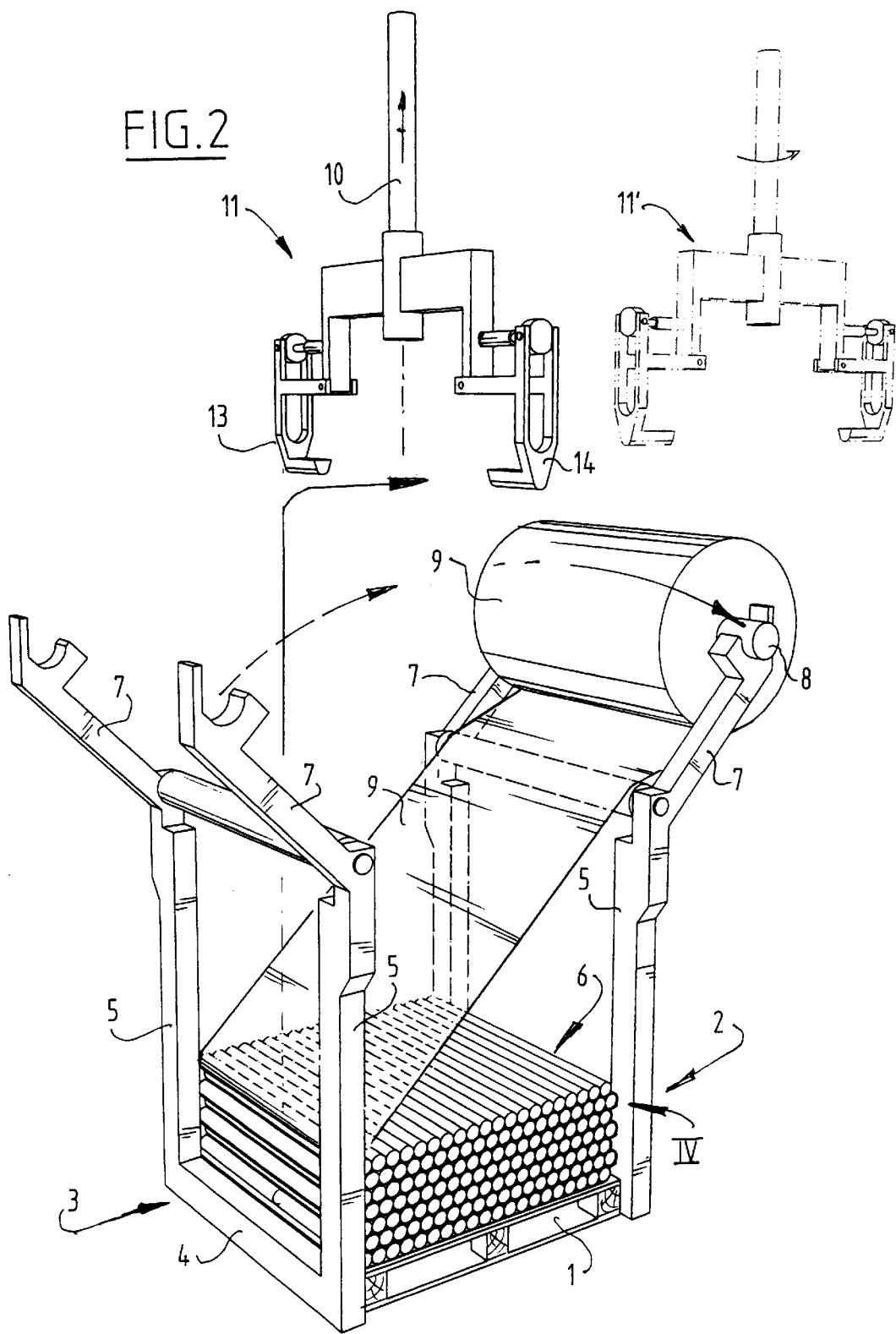
FIG. 2 shows a view corresponding with FIG. 1 wherein the roll of paper is placed on the second holder.

This robot arm is further also suitable for placing a shaft 8 for the roll of paper 9 from the one support to the other support. FIG. 1 herein shows how paper roll holder 8 is placed on the left-hand support 7, while FIG. 2 shows how shaft 8 is placed on the right-hand support 7.

Figure 3:
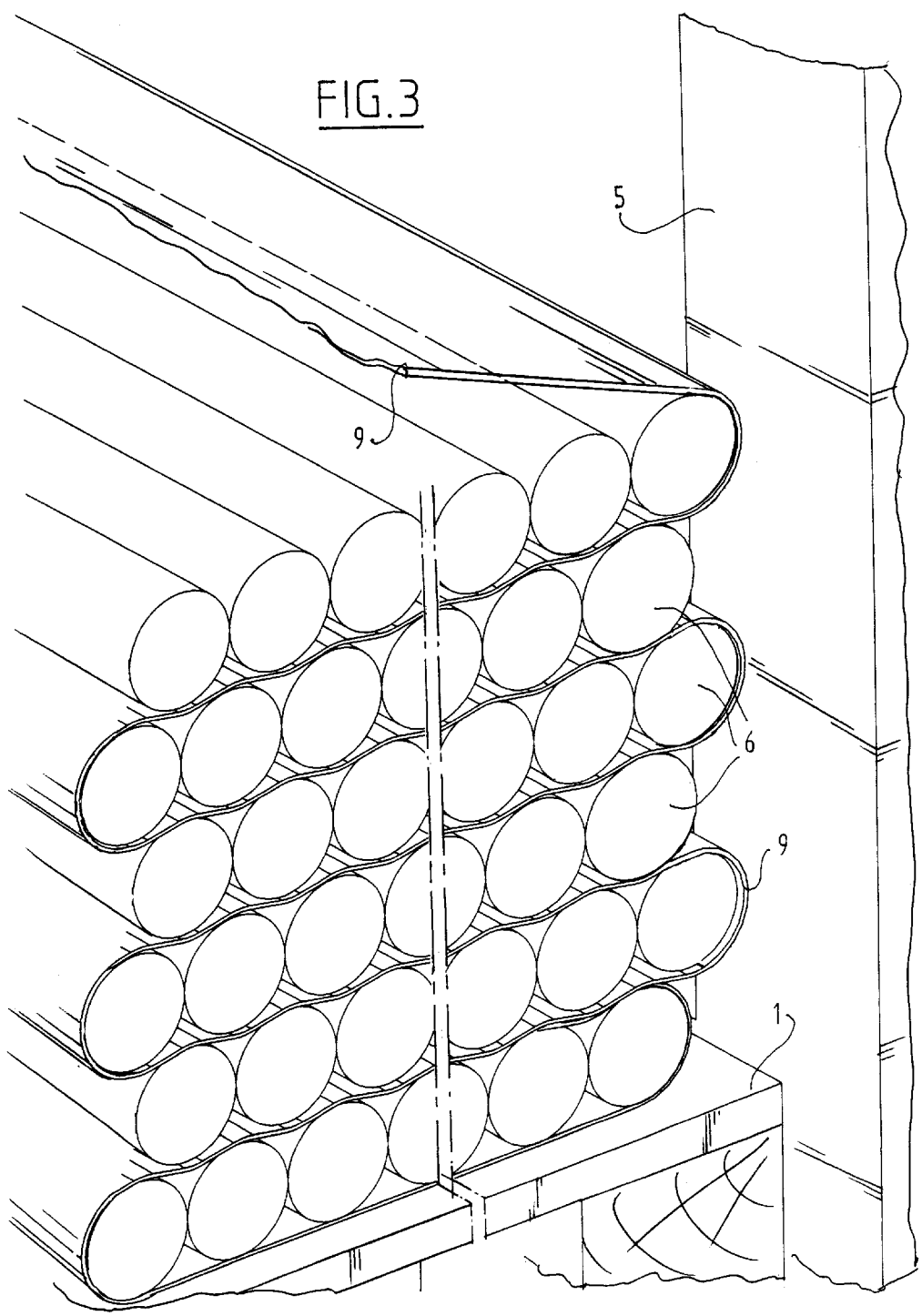
FIG. 3 shows a detail view of FIG. 1.
Figure 4:
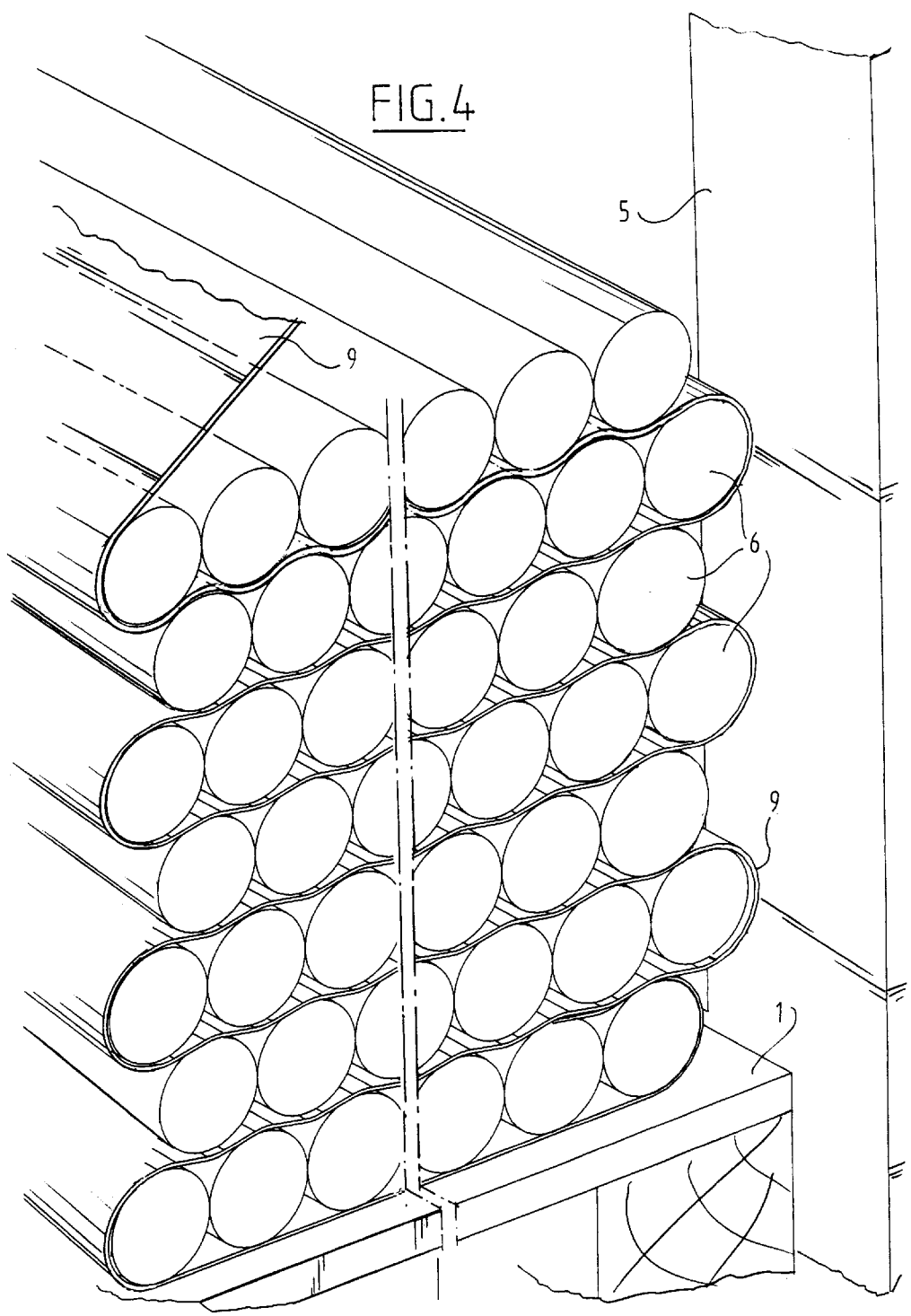
FIG. 4 shows a detail view of FIG. 2.

FIGS. 3 and 4 further show in more detail how the configuration of the stacked roll products 6 and the paper layer 9 is formed. It will be apparent that it is possible to apply numerous other configurations instead of this configuration.

It is also possible for the stacks of can lids to be placed unpacked on pallets. The term "cylindrical objects" then relates to the lids per se. The handling means, in this case the robot, are then suitable for handling stacked cylindrical objects. In order to prevent the stacks from falling apart at their head ends, holding means must be used, for instance in the form of "trays". After completion of a layer with rows of can lids an empty tray is placed, likewise by the robot, which is then filled by the robot.

It will further be apparent that diverse modifications can be made without departing from the invention.

What is claimed is:

1. An apparatus for palletizing substantially cylindrical objects, said apparatus comprising:

at least one pallet positioning member including at least two supports for being placed proximate a pallet;

at least one holder device comprising at least one support for a roll of material, the material intended for being arranged between the palletized cylindrical objects and for cooperating with the cylindrical objects when positioned on the pallet to prevent the cylindrical objects from separating from the pallet, wherein each said support of said at least one pallet positioning member is arranged at opposed sides of the at least one holder device; and a handling device moveable relative to the pallet, said handling device being of positioning the substantially cylindrical objects on the pallet and engaging and moving said at least one holder device relative to the pallet, wherein the handling device place the at least one holder device for a roll of material on another support device once a number of the cylindrical objects for palletizing have been placed on the pallet.

2. Apparatus according to claim 1 further comprising a roll of paper; and wherein the paper has a width that is smaller than or equal to half the length of the cylindrical objects when the cylindrical objects are positioned on the pallet.

3. Apparatus according to claim 1 wherein the apparatus is adapted to position the cylindrical objects in at least two adjacent rows on the pallet.

4. Apparatus according to claim 1 wherein the handling device is moveable relative to the at least one holder device and capable of positioning the at least one holder device on said another support device after placing at least one cylindrical object on the pallet.

5. Apparatus according to claim 1 wherein the handling device is adapted to position the cylindrical objects in layers on the pallet.

6. Apparatus according to claim 1 wherein the handling device is capable of receiving and positioning the cylindrical objects, and wherein the cylindrical objects include can lids.

7. Apparatus according to claim 1 wherein the at least one holder device comprises a plurality of trays and that the handling device is adapted to place one of said trays on the pallet after at least one layer of cylindrical objects is positioned on the pallet.

8. Apparatus according to claim 2 wherein the apparatus is adapted to position the cylindrical objects in at least two adjacent rows on the pallet.

9. Apparatus according to claim 2 wherein the handling device is moveable relative to the at least one holder device and capable of positioning the at least one holder device on said another support device after placing at least one cylindrical object on the pallet.

10. Apparatus according to claim 3 wherein the handling device is moveable relative to the at least one holder device and capable of positioning the at least one holder device to place on said another support device after placing at least one cylindrical object on the pallet.

11. Apparatus according to claim 2 wherein the apparatus is adapted for layer-wise placement of the objects.

12. Apparatus according to claim 2 wherein the handling device is capable of receiving and positioning the cylindrical objects, and wherein the cylindrical objects include can lids.

13. An apparatus for palletizing substantially cylindrical objects, said apparatus comprising:

a plurality of support devices for being positioned proximate a pallet on which said cylindrical objects can be positioned;

at least one holder comprising at least one support for carrying a material that is intended to be arranged between the palletized cylindrical objects, said at least one holder being supported by at least one of said plurality of support devices; and a handling device that is movable relative to said support devices and said at least one holder, said handling device positioning the substantially cylindrical objects on the pallet and engaging and moving said at least one holder relative to the pallet and onto another of the support devices once a number of the cylindrical objects for palletizing have been placed on the pallet.

14. Apparatus according to claim 13 wherein each said support device has a plurality of support members for receiving a respective end of the at least one holder.

15. Apparatus according to claim 13 wherein the handling device is secured to a movable robotic arm.

16. Apparatus according to claim 13 wherein the handling device includes members for contacting and moving said at least one holder after at least one of the cylindrical objects is positioned on the pallet.

17. Apparatus according to claim 13 wherein a first of said support devices is spaced from a second of said support devices by a distance that permits a pallet to be received between said first and second support devices.

18. Apparatus according to claim 13 wherein said at least one holder includes an axial shaft for a roll of material.

19. Apparatus according to claim 13 wherein said at least one holder includes a tray for positioning on the pallet.

* * * * *